US009445422B2

(12) United States Patent
Klang et al.

(10) Patent No.: US 9,445,422 B2
(45) Date of Patent: Sep. 13, 2016

(54) INTERFERENCE MANAGEMENT FOR D2D SYSTEM

(75) Inventors: Göran N. Klang, Enskede (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/399,444

(22) PCT Filed: May 25, 2012

(86) PCT No.: PCT/SE2012/050565
§ 371 (c)(1),
(2), (4) Date: Nov. 6, 2014

(87) PCT Pub. No.: WO2013/176592
PCT Pub. Date: Nov. 28, 2013

(65) Prior Publication Data
US 2015/0156783 A1    Jun. 4, 2015

(51) Int. Cl.
H04W 72/08    (2009.01)
H04W 36/26    (2009.01)
H04W 52/24    (2009.01)
H04W 36/20    (2009.01)
H04W 72/04    (2009.01)

(52) U.S. Cl.
CPC .......... *H04W 72/082* (2013.01); *H04W 36/26* (2013.01); *H04W 52/243* (2013.01); *H04W 36/20* (2013.01); *H04W 72/0406* (2013.01)

(58) Field of Classification Search
CPC .......... H04W 72/082; H04W 52/243; H04W 36/26; H04W 72/0406; H04W 36/20
See application file for complete search history.

(56) References Cited

U.S. PATENT DOCUMENTS

| 2009/0325625 | A1  | 12/2009 | Hugl et al. | |
| 2011/0170431 | A1* | 7/2011  | Palanki | H04W 52/245 370/252 |
| 2011/0228666 | A1* | 9/2011  | Barbieri | H04W 76/023 370/216 |
| 2011/0319084 | A1  | 12/2011 | Meshkati et al. | |

FOREIGN PATENT DOCUMENTS

WO    WO 2011/011637    1/2011

OTHER PUBLICATIONS

PCT Notification of Transmittal of the International Search Report and the Written Opinion of the International Searching Authority, or the Declaration for International application No. PCT/SE2012/050565, Nov. 7, 2012.
International Search Report for International application No. PCT/SE2012/050565, Nov. 7, 2012.

* cited by examiner

*Primary Examiner* — Chuong A Ngo
(74) *Attorney, Agent, or Firm* — Baker Botts, LLP

(57) ABSTRACT

User equipment, UEs, (306a,d) being interfered by direct D2D traffic, and UEs (306b,c) involved in D2D communication being interfered by a UE (306a,d), instead of passively reporting that they are interfered to their serving base station (305), intervene and communicate directly with the pair of D2D communicating UEs or the UE that are causing the interference without involving any of the serving base stations.

21 Claims, 3 Drawing Sheets

INTERFERENCE MANAGEMENT FOR D2D SYSTEM

PRIORITY

This nonprovisional application is a U.S. National Stage Filing under 35 U.S.C. §371 of International Patent Application Serial No. PCT/SE2012/050565, filed May 25, 2012 and entitled "Interference Management for D2D System".

TECHNICAL FIELD

The field of the present disclosure is that of controlling intra-cell interference and inter-cell interference in connection with device-to-device communication in a cellular radio communication system.

BACKGROUND

In cellular networks direct device-to-device, D2D, communication provides an option to off-load traffic from base station and core networks serving user equipments, UEs, that want to share data with each other and that are in each other's proximity.

In the case direct D2D communication takes place in spectrum assigned to a cellular network, radio resource management actions such as mode selection, network controlled scheduling and power control are typically necessary so that the direct D2D communication is under the cellular network operator's supervision and control. For example, in the case of network-assisted D2D communication, the network typically provides different types of support functions and mechanisms to identify sufficiently closely spaced UEs and to establish, maintain, and terminate D2D connections as well as to allocate transmit power and time/frequency or code resources for D2D links.

However, a well-known problem inherent to allowing direct D2D communication within spectrum used for cellular network operation is that it gives rise to new intra- and inter-cell interference situations. For example, in case of a cellular network utilizing frequency division duplex, FDD, and where the direct D2D communication scheme is based on time division duplex, TDD, due to the presence of the D2D communication links, intra-cell orthogonality may no longer be maintained. Specifically, if the D2D links use downlink, DL, resources, i.e., the DL frequency band, D2D node transmission may cause severe intra-cell interference to UEs within the same cell. In addition, the transmission from this same D2D node may generate inter-cell interference to UEs in neighboring cells. Similarly, in cases where the uplink, UL, frequency band of the cellular network is used for the direct D2D communication, the serving base station might experience severe UL interference (i.e., intra-cell interference) due to the transmissions of the D2D nodes.

Prior art solutions for controlling the intra- and inter-cell interference between the cellular and the D2D layers are based on the assumption that the radio resources and the interference are managed by a cellular network and in particular a cellular base station or access point (also called eNB in the third generation partnership project, 3GPP, Long Term Evolution, LTE, system). This is a reasonable assumption, since the cellular spectrum in all legacy systems, as well as systems allowing direct mode D2D communications in cellular spectrum are owned by a cellular operator and managed by the cellular network.

Managing the new type of intra-cell and inter-cell interference due to the presence of D2D communications is a highly non trivial task, since it involves several aspects that are specific to the new type of (namely D2D) communications. Traditional cellular methods assume that all unexpected or sudden interference can only be caused by inter-cell interferers, which is not the case in D2D communications. Secondly, traditional methods are built on the presence of a direct control channel between the base station and the user equipment, which is not the case in D2D communications during periods when the devices are engaged in direct mode D2D communications. Lastly, traditional interference methods do not assume that D2D capable devices can transmit and receive messages to one other without involving the cellular base station, which is the case in D2D communications.

Based on these premises, prior art solutions for controlling such interference situations include those where a node in the network, e.g. a base station or NodeB, dynamically controls which resource the D2D pair may use for the D2D direct communication. Such solutions have a drawback that it requires substantial network resources such as signaling and processing resources. These drawbacks increase in cases where two or more base stations, i.e. neighboring cells, become involved in the process.

In other types of D2D systems, such as ad-hoc systems utilizing Bluetooth or WiFi Direct technology, schemes for interference management build on the assumption that communicating nodes need to solve any potential interference problem without infrastructure intervention or assistance. This is because in these technologies there is typically no central entity that can help the ad-hoc nodes to properly allocate resources and manage interference. Furthermore, in these technologies there is no hierarchy among communicating nodes in terms of which device may or may not cause interference to another. Moreover, due to the fact that such ad-hoc networks operate in unlicensed spectrum they can suffer interference from other technologies or even interference sources that are completely unknown and thereby totally uncontrollable, such as household appliances and medical equipment.

In conclusion, prior art methods for managing interference in D2D systems suffer from intra-cell interference, inter-cell interference and the limitations of central handling of radio resource management.

SUMMARY

In order to mitigate at least some of the drawbacks as discussed above, there is provided in a first aspect a method for reducing radio interference in a first mobile communication terminal. The first mobile communication terminal is operating via at least one downlink resource of a plurality of downlink radio resources in relation to a base station in a cell in a cellular mobile communication system, for example frequency bands in an FDD system or time intervals in a TDD system. The method comprises detecting a deterioration of radio reception on at least one downlink radio resource. A determination is made that the deterioration of radio reception on the at least one downlink radio resource is due to interference from transmissions by any of a second mobile communication terminal and a third mobile communication terminal involved in a device-to-device communication session. Transmission is then made, in a radio resource of the plurality of downlink radio resources, of information for triggering any of the second and third mobile communication terminals to operate such that the interference is reduced.

In a second aspect there is provided a method for reducing radio interference in a second mobile communication terminal, the second mobile communication terminal being involved in a device-to-device communication session with a third mobile communication terminal. The device-to-device communication takes place via at least one uplink radio resource of a plurality of uplink radio resources, said uplink radio resources being in relation to a base station in a cell in a cellular mobile communication system, for example frequency bands in an FDD system or time intervals in a TDD system. The method comprises detecting a deterioration of radio reception on the at least one uplink radio resource. A determination is made that the deterioration of radio reception on the at least one uplink radio resource is due to interference from transmissions by a first mobile communication terminal. Transmission is then made, in a radio resource of the plurality of uplink radio resources, of information for triggering the first mobile communication terminal to operate such that the interference is reduced.

In other words, these aspects mitigate the drawbacks as summarized above in that UEs being interfered by direct D2D traffic, and UEs involved in D2D communication being interfered by a UE, instead of passively reporting that they are interfered to their serving base station, intervene and communicate directly with the pair of D2D communicating UEs or the UE that are causing the interference without involving any of the serving base stations.

As will be summarized further below, this approach allows different measures to be taken by an interfering pair of D2D communicating UEs (i.e. the second and third UE) or the UE (i.e. the first UE) that interferes with an UE in a D2D pair, either more or less autonomously or involving the network, to resolve or deal with the drawbacks of prior art.

For example, the transmission of the triggering information for any of the second and third mobile communication terminals, or the first mobile communication terminal, to operate such that the interference is reduced can comprise transmission of information for triggering any of the second and third terminals, or the first terminal, to perform an inter-frequency handover procedure. Such a transmission of triggering information can also comprise a request to reduce transmission power.

In other embodiments reception is made of information that identifies any of the second and third mobile communication terminals, or the first mobile communication terminal. The reception takes place in a downlink radio resource or in an uplink resource, respectively. In these embodiments, the transmission of the triggering information for any of the second and third terminals, or the first terminal, to operate such that the interference is reduced comprise transmission of a control message requesting the identified second and third terminals, or the identified first terminal, to perform scheduling of transmission for reducing the interference.

In other embodiments reception is made of information that identifies any of the second and third mobile communication terminals, or the first mobile communication terminal. The reception takes place in a downlink radio resource or in an uplink resource, respectively. In these embodiments, the transmission of the triggering information for any of the second and third terminals, or the first terminal, to operate such that the interference is reduced comprise transmission of a control message requesting the identified second and third terminals to start a procedure of negotiation regarding transmission with the first terminal, or the identified first terminal to start a procedure of negotiation regarding transmission with the second and third terminals, for reducing the interference.

Although this approach can be seen as a more or less autonomous it is to be pointed out that it differs from prior art Bluetooth and WFi Direct ad-hoc systems. That is, in such prior art ad-hoc networks, the communicating devices are allowed to act completely on their own, since the devices operate in the unlicensed band and they have equal rights to access the spectrum. In contrast, in the D2D scheme of the present disclosure the mobile communication terminals access licensed operator spectrum (i.e. they are parts of a cellular mobile communication system) and therefore the mobile communication terminals must get permission or must be controlled by the cellular base station in terms of which resources (e.g. frequency subcarriers or time slots) they can access. In fact, the aspects of the present disclosure can be seen as a semi-distributed mechanism that allows "be quiet!" signals between the terminals, but at the same time makes sure that the a base station can control which resources the terminals access.

In a third aspect there is provided a mobile communication terminal configured to operate via at least one downlink resource of a plurality of downlink radio resources in relation to a base station in a cell in a cellular mobile communication system, for example frequency bands in an FDD system or time intervals in a TDD system. The terminal comprises detection circuitry for detecting a deterioration of radio reception on at least one downlink radio resource, determination circuitry for determining that the deterioration of radio reception on the at least one downlink radio resource is due to interference from transmissions by any of a second mobile communication terminal and a third mobile communication terminal involved in a device-to-device communication session, and transmission circuitry for transmitting, in a radio resource of the plurality of downlink radio resources, information for triggering any of the second and third mobile communication terminals to operate such that the interference is reduced.

In a fourth aspect there is provided a mobile communication terminal configured to operate as a second mobile communication terminal in a device-to-device communication session with a third mobile communication terminal. The device-to-device communication takes place via at least one uplink radio resource of a plurality of uplink radio resources, said uplink radio resources being in relation to a base station in a cell in a cellular mobile communication system, for example frequency bands in an FDD system or time intervals in a TDD system. The mobile communication terminal comprises detection circuitry for detecting a deterioration of radio reception on the at least one uplink radio resource, determination circuitry for determining that the deterioration of radio reception on the at least one uplink radio resource is due to interference from transmissions by a first mobile communication terminal, and transmission circuitry for transmitting, in a radio resource of the plurality of uplink radio resources, information for triggering the first mobile communication terminal to operate such that the interference is reduced.

In a fifth aspect there is provided a computer program product comprising software instructions that are configured, when executed in a processing device, to perform the method of the first aspect.

In a sixth aspect there is provided a computer program product comprising software instructions that are configured, when executed in a processing device, to perform the method of the second aspect.

The effects and advantages of the third, fourth, fifth and sixth aspects correspond to those summarized above in connection with the first and second aspects.

DETAILED DESCRIPTION OF EMBODIMENTS

Figure 1:
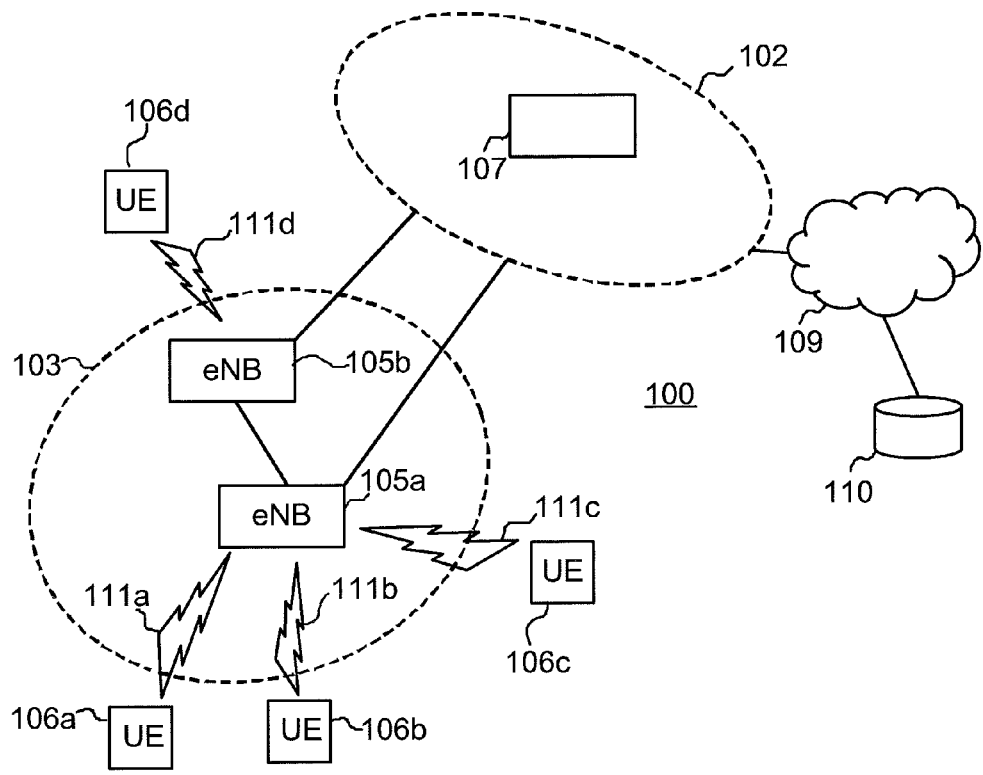
FIG. 1 illustrates schematically a mobile communication system.

FIG. 1 illustrates schematically a cellular mobile communications system 100 in which the above summarized methods and apparatuses may be implemented. It should be noted, however, that the skilled person will readily be able to perform implementations in other similar communication systems involving transmission of coded data between nodes.

In FIG. 1 the system 100 comprises a core network 102, for example a System Architecture Evolution, SAE, network, and a long term evolution, LTE, terrestrial radio access network, E-UTRAN, 103. The E-UTRAN 103 comprises a number of nodes or base stations in the form of enhanced NodeBs, or eNBs. Each eNB 105 is responsible for one or more cells and signaling between the eNBs 105 and the core network 102, as well as signaling between the eNBs 105, takes place according to protocols known to the person skilled in the art. FIG. 1 also illustrates nodes in the form of mobile communication terminals, or user equipment, UE, 106a-d connected to a respective eNB 105a-b in the radio access network 103 via a respective air interface 111a-d. As the skilled person will realize, the air interfaces include uplink resources and downlink resources that can be in the form of radio frequency bands and time intervals. Mobile terminals served by one eNB, such as terminals 106a and 106b served by eNB 105a, are located in a radio cell.

A node 107 in the core network 102 represents the functionality of the core network 102 including data communications between terminals 106 and a server 110 connected to the Internet 109. As the skilled person realizes, the system 100 in FIG. 1 may comprise a large number of similar functional units in the core network 102 and the radio access network 103, and in typical realizations of networks, the number of mobile devices may be very large.

Figure 2A:
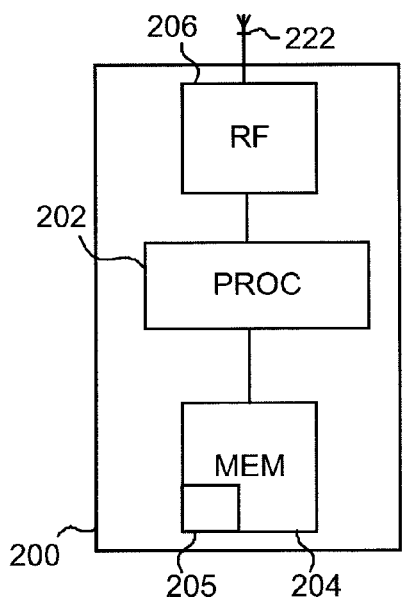
FIGS. 2a and 2b illustrate schematically a mobile communication terminal.

FIG. 2a illustrates schematically a mobile communication terminal 200, corresponding to any of the terminals 106 in FIG. 1. The mobile communication terminal 200 comprises a processor 202, a memory 204, radio frequency, RF, receiving and transmitting circuitry 206 and an antenna 222. Radio communication via the antenna 222 is realized by the RF circuitry 206 controlled by the processor 202, as the skilled person will understand. The processor 202 makes use of software instructions 205 stored in the memory 204 in order to control all functions of the terminal 200, including the functions to be described in detail below with regard to interference reduction. In other words, at least the RF circuitry 206, the processor 202 and the memory 204 form parts of control and communication circuitry that is configured to control interference reduction as summarized above and described in detail below. Further details regarding how these units operate in order to perform normal functions within a mobile communication system, such as the system 100 of FIG. 1, are outside the scope of the present disclosure and are therefore not discussed further.

Figure 2B:
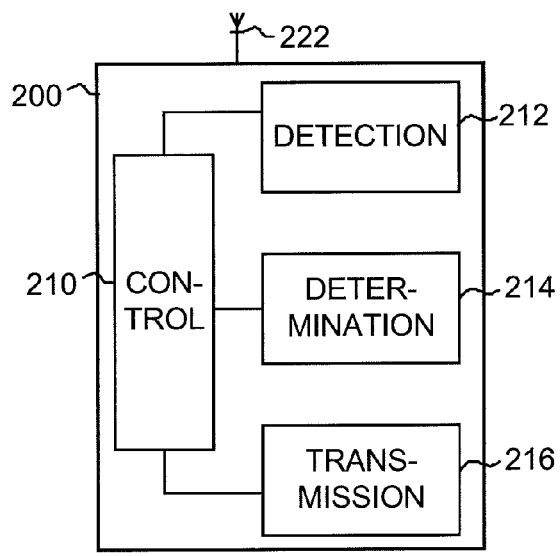

The mobile communication terminal 200 can also be described in terms of more specific functions, as illustrated in FIG. 2b. In FIG. 2b control circuitry 210 is connected to detection circuitry 212, determination circuitry 214 and transmission circuitry 216. This circuitry can realize methods for reducing radio interference as will be described in more detail below.

Figure 3:
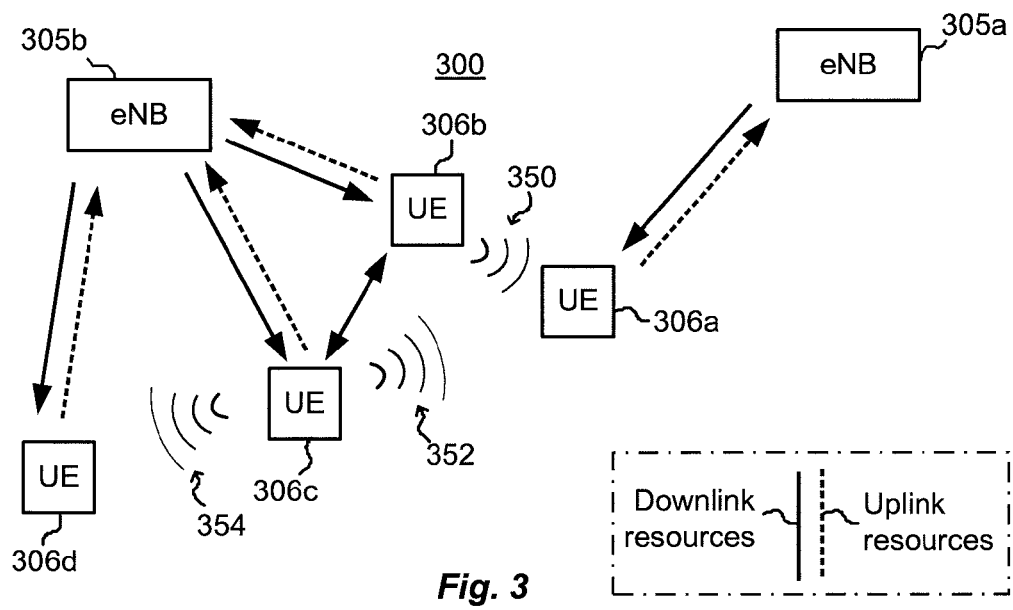
FIG. 3 illustrates schematically communication links and interference in a mobile communication system.
Figure 4:
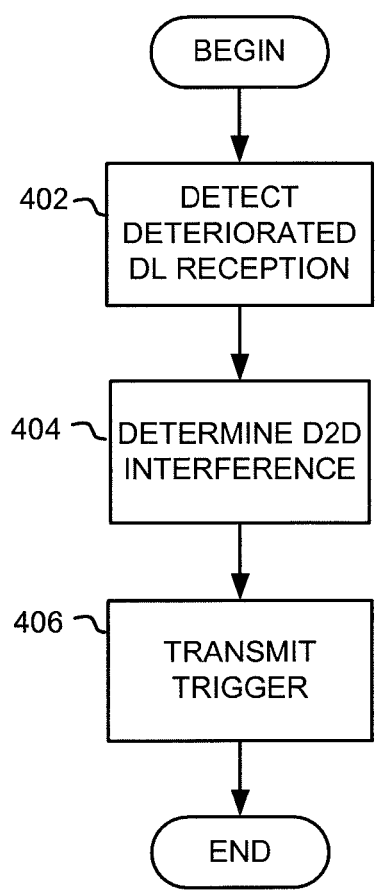
FIG. 4 is a flow chart of a method for reducing interference.

Turning now to FIGS. 3 and 4, a method for reducing radio interference in a first mobile communication terminal 306a,306d will be described. The first mobile communication terminal 306a,306d is operating via at least one downlink resource of a plurality of downlink radio resources in relation to a base station 305a,305b in a cell in a cellular mobile communication system 300. The mobile communication terminal 306a,306d may correspond to any of the terminals 106 in FIG. 1 and the base station 305a,305b may be any of the eNBs in in the system 100 in FIG. 1.

Consider the system 300 shown in FIG. 3. For simplicity, without loss of generality, terminal 306b and terminal 306c form a D2D pair communicating using the downlink frequency resource of the system 300. If, due to e.g., movement of the D2D pair 306b, 306c, changing radio conditions, etc., the D2D pair 306b, 306c is getting close from a radio transmission perspective to one or more terminals 306a, 306d, actively communicating or simply monitoring their serving eNBs 305a and eNB 305b, respectively, the direct D2D communication link between terminal 306b and terminal 306c may start interfering and thus impair the downlink reception quality of these terminals 306a, 306d. In a traditional setup, i.e. according to prior art solutions, these interfered terminals 306a, 306d would report to their respective serving eNB 305a, 305b that they experience interference and, implicitly or explicitly, request actions to be taken and/or instructions how to locally take measures to counteract the problem.

Instead of passively handling the interference problem that may occur in case of D2D communication, terminals can if they have direct D2D communication capability themselves, or sufficiently, if they have the ability to not only receive but also transmit by using downlink resources, e.g. frequency band, take active measures to deal with the D2D induced interference. Such active measures are included in the method illustrated in FIG. 4.

The method commences with a detection step 402 comprising detecting a deterioration of radio reception on at least one downlink radio resource.

A determining step 404 comprises determining that the deterioration of radio reception on the at least one downlink radio resource is due to interference 350,352,354 from transmissions by any of a second mobile communication terminal 306b and a third mobile communication terminal 306c involved in a device-to-device communication session.

A transmission step 406 comprises transmitting, in a radio resource of the plurality of downlink radio resources, information for triggering any of the second and third mobile communication terminals 306b, 306c to operate such that the interference is reduced.

In some more detail, the terminal 306a, 306d detects that its downlink reception is deteriorated due to interference 350,352,354. The detection of downlink deterioration due to interference can be performed by measurements of the Received Signal Strength Indicator, RSSI, Reference Signal Received Power, RSRP, and Reference Signal Received Quality, RSRQ. RSSI, RSRP and RSRQ measurements are well known to the skilled person in the art of cellular communication systems. In particular, when the terminal 306a, 306d measures an increase of the RSSI, it indicates an increase of the total received wideband power. When the terminal 306a, 306d measures a constant RSRP, but an increase of the RSSI exceeds a predefined threshold, it is considered by the terminal 306a 306d as an indication of increasing interference. As it is also known by the person skilled in the art of device-to-device communications, D2D transmitters continuously or periodically transmit reference signals that can also be measured by surrounding terminals 306a, 306d. When terminals 306a, 306d experience increasing interference as described above and measure D2D reference signals, such measurement unambiguously constitute the detection of downlink deterioration due to interference.

The terminal 306a, 306d establishes that the interference 350,352,354 is due to D2D traffic in its vicinity, for example by assuming that the interference is caused by one or more interfering D2D pairs, or by using more advanced approaches where e.g., it actively detects the presence of D2D traffic and/or possibly even identifies which D2D pair(-s) it is that cause(s) the interference. That is, the determination step 404 can comprise detecting, in a radio resource of the plurality of downlink radio resources, information that specifies that a device-to-device communication is active.

The method can also comprise a step of receiving, in a radio resource of the plurality of downlink radio resources, information identifying the second and third mobile communication terminals 306b, 306c.

For example, in an LTE environment, in order to enable a terminal to determine that a source of interference is a D2D pair of terminals, D2D transmitters continuously transmit reference signals, RS, that uniquely encode the D2D identity within the serving cell. When in connected mode, a terminal continuously decodes RSs from neighbouring eNBs (for the purpose of new cell identification) and also from neighbouring D2D pairs. The terminal uses the RSs to identify neighbouring eNBs and D2D pairs and to perform measurements to identify the (relative) proximity (in terms of e.g. reference signal received power, RSRP) of neighbouring eNBs and D2D transmitters.

As defined in the transmission step 406, the interfered terminal may instead, due to its capability of transmitting in the downlink resource intervene in the communication of the interfering D2D pair(-s) by transmitting (e.g. broadcasting) information in the form of, e.g., a control message on the downlink resource that the D2D pair(-s) may receive, interpret, and act on. Depending on what type of interaction that is desirable and what radio resource management strategy the network design targets, different types of control messages are conceivable.

In some embodiments the control message sent from the interfered terminal can comprise a message that triggers the interfering D2D pair(-s) to initiate inter-frequency handover, IFHO, request(-s) to its serving eNB(-s), i.e., a "shut-up" message that tries to force the D2D traffic over to the uplink resources or to another subset of the downlink resources. In detail, this "shut-up" message sent by the interfered terminal can be constructed in different ways. It can consist of dummy data that essentially targets to interfere with the D2D traffic in order to trigger the D2D pair(-s) quality-of-service, QoS, mechanisms to initiate an IFHO. Such dummy data can be an Internet Protocol, IP, broadcast datagram or an unsolicited Buffer Status Report message or a transmission of Sounding Reference Signals, SRS, over the entire or parts of the frequency bands that the D2D pair uses for D2D communications.

A second alternative is that it provides a valid broadcast type general control message that requests any D2D pair detecting the message to initiate an IFHO. A third alternative is that it provides a valid control message targeting explicitly the interfering D2D pair. For the third alternative, the interfered terminal uses the D2D identity that the interfered terminal identified based on the transmitted D2D reference signals.

In some embodiments, the control message sent from the interfered terminal can comprise a message that requests the interfering D2D pair(-s) to reduce their output power, i.e., a "Schhh" message. Similar to how the "shut-up" message can be constructed, the "Schhh" message can be a valid broadcast type message that requests any D2D pair detecting the message to reduce their output power or, as an alternative it can provide a valid control message targeting explicitly the identified interfering D2D pair only.

In some embodiments, the control message sent from the interfered terminal to an identified D2D transmitter can comprise a message that requests or suggests scheduling, i.e., a "One-at-a-time please" message, following some possibly predefined procedure to allow both the D2D pair and the interfered terminal to maintain their communication links.

In some embodiments, the control message sent from the interfered terminal can comprise a general query or instruction where, for example the duration of the D2D session is requested or some other relevant information is retrieved (by the interfered terminal from the D2D pair) to start a negotiation between the D2D pair(-s) and the interfered terminal to resolve the interference problem.

In such embodiments, full/half duplex D2D connectivity is established between the D2D pair(-s) and the interfered terminal. In LTE embodiments this will entail a number of procedures: at D2D bearer setup, the eNB assigns specific (periodic) physical resource blocks, PRB, that the D2D pair must reserve as a control signaling channel. When a D2D capable terminal enters connected mode, the eNB informs the terminal about the control channel locations of the currently ongoing D2D links. Several D2D links may have the same control channel assignment (and so this piece of information does not become prohibitive for the cellular terminals). When scheduling D2D traffic, the D2D receiver and transmitter must not use the PRBs reserved for the control channel. The current D2D receiver (recall that in TDD mode, the transmitter and receiver of the D2D pair alternates in time) listens to the control channel that may be potentially used by nearby cellular UEs to send "Shut up" or "Ssssch" messages.

Figure 5:
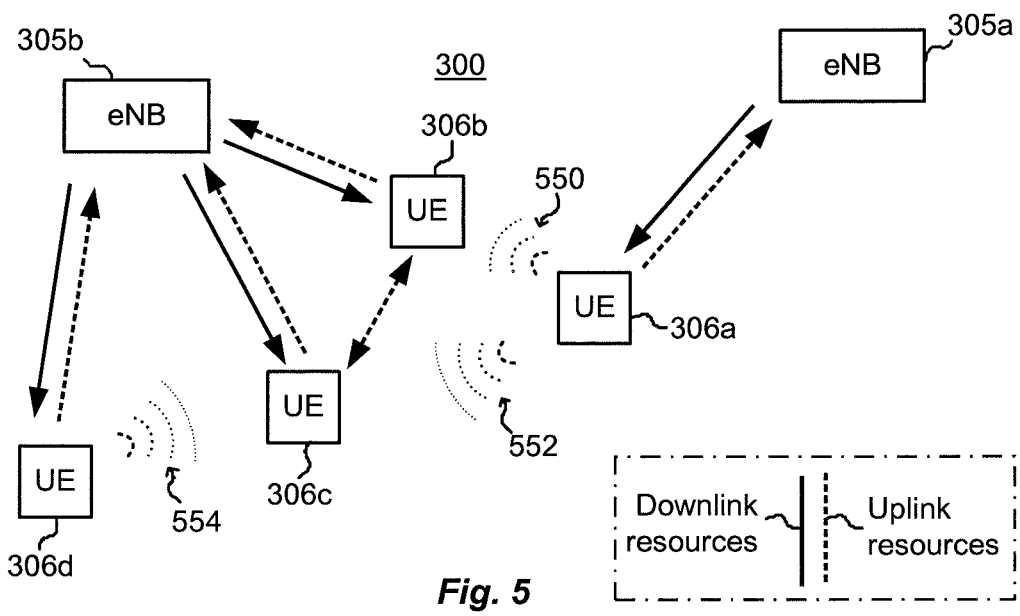
FIG. 5 illustrates schematically communication links and interference in a mobile communication system.

Turning now to scenarios illustrated in FIGS. 5 and 6, a method for reducing radio interference in a second mobile communication terminal 306b,306c will be described. The second mobile communication terminal 306b,306c is involved in a device-to-device communication session with a third mobile communication terminal 306c, 306b. The device-to-device communication takes place via at least one uplink radio resource of a plurality of uplink radio resources, said uplink radio resources being in relation to a base station in a cell in a cellular mobile communication system 300. Similar to the embodiments described above, the mobile communication terminal 306b,306c may correspond to any of the terminals 106 in FIG. 1.

That is, reduction of interference can also be applied in a scenario in which a D2D pair of terminals 306b, 306c uses cellular uplink resources for the D2D communication. In such embodiments, the interfering terminal 306a, 306d can cause severe interference 550, 552, 554 to a receiving terminal in a D2D pair, as shown in FIG. 5. Such a situation can occur, when, for example, shadowing and propagation conditions are such that terminals 306b and 306c do not cause interference to eNB 305b and/or they use low power for the D2D communications, but the D2D receiver gets into the proximity of another terminal 306a, 306d. Using D2D communications, the D2D receiver can now transmit either a "Sssch" or a "Shutup" message (as described above) to the terminal that is causing interference to the D2D receiver.

The terminal that is receiving such a message can, for example, inform its serving eNB by sending a "D2D interference high" message that the eNB takes into account in its uplink scheduling and power control algorithms.

Figure 6:
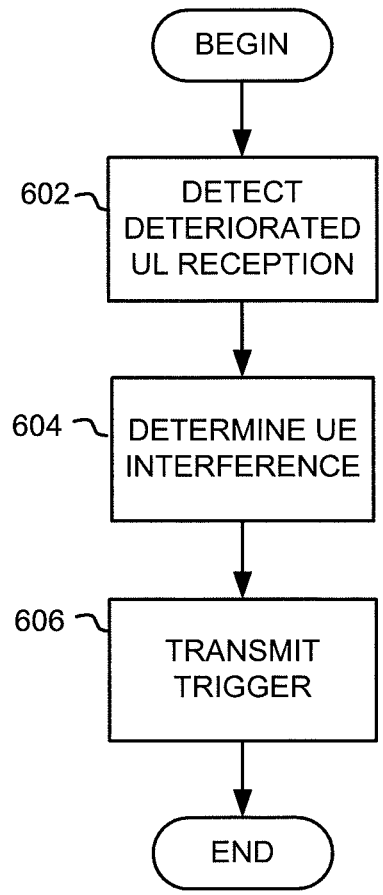
FIG. 6 is a flow chart of a method for reducing interference.

In the most general form, such a scenario can be described by the method illustrated in the flow chart of FIG. 6.

The method commences with a detection step 602 comprising detecting, by the D2D receiver terminal in the D2D pair 306b,306c, a deterioration of radio reception on the at least one uplink radio resource. Such a detection of deterioration of radio reception can be similar to the detection of deterioration of radio reception described above in connection with FIG. 4, i.e. based on RSSI measurements performed by the D2D receiver on uplink resources. In addition, the D2D receiver terminal can perform bit error rate, BER, and block error rate, BLER, measurements on the received user plane data over uplink resources. Such BER and BLER measurements are known to a person skilled in the art of receiver design. An increase of the RSSI or an increase of the BER and BLER measures that exceed a predefined threshold constitute an unambiguous indication of the deterioration of the radio reception.

A determining step 604 comprises determining that the deterioration of radio reception on the at least one uplink radio resource is due to interference 550,552,554 from transmissions by a first mobile communication terminal 306a, 306d.

A transmission step 606 comprises transmitting, in a radio resource of the plurality of uplink radio resources, information for triggering the first mobile communication terminal 306a, 306d to operate such that the interference is reduced.

Having the scenario described above in mind, where the interfering terminal is one of a pair of terminals involved in a D2D session using downlink resources, embodiments of this scenario where uplink resources are used are very similar as will be described in the following.

The transmission of information for triggering the first mobile communication terminal to operate such that the interference is reduced can comprise transmitting information for triggering the first mobile communication terminal to perform an inter-frequency handover procedure. For example, this includes transmitting dummy data for interfering with the transmissions by the first mobile communication terminal or transmitting a control message requesting the first mobile communication terminal to perform an inter-frequency handover procedure. Such said dummy data can be an Internet Protocol, IP, broadcast datagram or an unsolicited Buffer Status Report message or a the transmission of Sounding Reference Signals, SRS, over the entire or parts of the frequency bands that the D2D pair uses for D2D communications.

A control message requesting an identified first mobile communication terminal to perform an inter-frequency handover procedure can be transmitted in cases where the identity of the first mobile communication terminal has been received.

Further embodiments include those where the transmission of information for triggering the first mobile communication terminal to operate such that the interference is reduced comprises transmitting a control message requesting the first mobile communication terminal to reduce transmission power. A control message requesting an identified first mobile communication terminal to reduce transmission power can be transmitted in cases where such identity has been received in an uplink radio resource.

Further embodiments include those where the transmission of information for triggering the first mobile communication terminal to operate such that the interference is reduced comprises transmitting, after receiving an identification of the first mobile communication terminal in an uplink radio resource, a control message. The control message can be a message that requests the identified first mobile communication terminal to perform scheduling of transmission for reducing the interference on the at least one uplink radio resource. The control message can also be a message that requests the identified first mobile communication terminal to start a procedure of negotiation with the second and third mobile communication terminals regarding transmission on the plurality of uplink resources for reducing the interference on the at least one uplink radio resource.

The invention claimed is:

1. A method for reducing radio interference in a first mobile communication terminal, the first mobile communication terminal operating via at least one downlink resource of a plurality of downlink radio resources in relation to a base station in a cell in a cellular mobile communication system, the method comprising:
   detecting, by the first mobile communication terminal, a deterioration of radio reception on at least one downlink radio resource;
   determining, by the first mobile communication terminal, that the deterioration of radio reception on the at least one downlink radio resource is due to interference from transmissions by any of a second mobile communication terminal and a third mobile communication terminal involved in a device-to-device communication session between the second mobile communication terminal and the third mobile communication terminal; and
   transmitting, by the first mobile communication terminal, in a radio resource of the plurality of downlink radio resources, information for triggering any of the second and third mobile communication terminals to operate such that the interference is reduced in response to the determination.

2. The method of claim 1, wherein the determination that the deterioration of radio reception on the at least one downlink radio resource is due to interference from transmissions by a mobile communication terminal involved in a device-to-device communication session comprises detecting, by the first mobile communication terminal, in a radio resource of the plurality of downlink radio resources, information that specifies that the device-to-device communication is active.

3. The method of claim 1, wherein the transmission of information for triggering any of the second and third mobile communication terminals to operate such that the interference is reduced comprises transmitting, by the first mobile communication terminal, information for triggering the second mobile communication terminal and the third mobile communication terminal to perform an inter-frequency handover procedure.

4. The method of claim 3, wherein the transmission of information for triggering the second mobile communication terminal and the third mobile communication terminal to perform an inter-frequency handover procedure comprises transmitting, by the first mobile communication terminal, dummy data for interfering with the device-to-device communication between the second mobile communication terminal and the third mobile communication terminal.

5. The method of claim 3, wherein the transmission of information for triggering the second mobile communication terminal and the third mobile communication terminal to perform an inter-frequency handover procedure comprises transmitting, by the first mobile communication terminal, a control message requesting the second mobile communication terminal and the third mobile communication terminal to perform an inter-frequency handover procedure.

6. The method of claim 3, further comprising receiving, by the first mobile communication terminal, in a radio resource of the plurality of downlink radio resources, information identifying the second mobile communication terminal and the third mobile communication terminal, and wherein the transmission of information for triggering the second mobile communication terminal and the third mobile communication terminal to perform an inter-frequency handover procedure comprises transmitting, by the first mobile communication terminal a control message requesting the second mobile communication terminal and third mobile communication terminal to perform an inter-frequency handover procedure.

7. The method of claim 1, wherein the transmission of information for triggering any of the second mobile communication terminal and the third mobile communication terminal to operate such that the interference is reduced comprises transmitting, by the first mobile communication terminal, a control message requesting the second mobile communication terminal and the third mobile communication terminal to reduce transmission power.

8. The method of claim 7, further comprising receiving, by the first mobile communication terminal, in a radio resource of the plurality of downlink radio resources, information identifying the second mobile communication terminal and the third mobile communication terminal, and wherein the transmission of a control message requesting the second mobile communication terminal and the third mobile communication terminal to reduce transmission power comprises transmitting, by the first mobile communication terminal, a control message requesting the second mobile communication terminal and the third mobile communication terminal to reduce transmission power.

9. The method of claim 1, further comprising receiving, by the first communication terminal, in a radio resource of the plurality of downlink radio resources, information identifying the second mobile communication terminal and the third mobile communication terminal, and wherein the transmission of information for triggering any of the second mobile communication terminal and the third mobile communication terminal to operate such that the interference is reduced comprises transmitting, by the first mobile communication terminal, a control message requesting the second mobile communication terminal and the third mobile communication terminal to perform scheduling of transmission for reducing the interference on the at least one downlink radio resource.

10. The method of claim 1, further comprising receiving, by the first mobile communication terminal, in a radio resource of the plurality of downlink radio resources, information identifying the second mobile communication terminal and the third mobile communication terminal, and wherein the transmission of information for triggering any of the second and third mobile communication terminals to operate such that the interference is reduced comprises transmitting, by the first mobile communication terminal, a control message requesting the second mobile communication terminal and the third mobile communication terminal to start a procedure of negotiation with the first mobile communication terminal regarding transmission on the plurality of downlink resources for reducing the interference on the at least one downlink radio resource.

11. A method for reducing radio interference in a second mobile communication terminal, the device-to-device communication taking place via at least one uplink radio resource of a plurality of uplink radio resources, said uplink radio resources being in relation to a base station in a cell in a cellular mobile communication system, the method comprising:
   detecting, by the second mobile communication terminal, a deterioration of radio reception on the at least one uplink radio resource, wherein the second mobile communication terminal is involved in a device-to-device communication session with a third mobile communication terminal;
   determining, by the second mobile communication terminal, that the deterioration of radio reception on the at least one uplink radio resource is due to interference from transmissions by a first mobile communication terminal; and
   transmitting, by the second mobile communication terminal, in a radio resource of the plurality of uplink radio resources, information for triggering the first mobile communication terminal to operate such that the interference is reduced in response to the determination.

12. The method of claim 11, wherein the transmission of information for triggering the first mobile communication terminal to operate such that the interference is reduced comprises transmitting, by the second mobile communication terminal, information for triggering the first mobile communication terminal to perform an inter-frequency handover procedure.

13. The method of claim 12, wherein the transmission of information for triggering the first mobile communication terminal to perform an inter-frequency handover procedure comprises transmitting, by the second mobile communication terminal, dummy data for interfering with the transmissions by the first mobile communication terminal.

14. The method of claim 12, wherein the transmission of information for triggering the first mobile communication terminal to perform an inter-frequency handover procedure comprises transmitting, by the second mobile communication terminal, a control message requesting the first mobile communication terminal to perform an inter-frequency handover procedure.

15. The method of claim 12, further comprising receiving, by the second mobile communication terminal, in a radio resource of the plurality of uplink radio resources, information identifying the first mobile communication terminal, and wherein the transmission of information for triggering the first mobile communication terminal to perform an inter-frequency handover procedure comprises transmitting, by the second mobile communication terminal, a control message requesting the identified first mobile communication terminal to perform an inter-frequency handover procedure.

16. The method of claim 11, wherein the transmission of information for triggering the first mobile communication terminal to operate such that the interference is reduced comprises transmitting, by the second mobile communication terminal, a control message requesting the first mobile communication terminal to reduce transmission power.

17. The method of claim 16, further comprising receiving, by the second mobile communication terminal, in a radio resource of the plurality of uplink radio resources, information identifying the first mobile communication terminal, and wherein the transmission of a control message requesting the first mobile communication terminal to reduce transmission power comprises transmitting a control message requesting the identified first mobile communication terminal to reduce transmission power.

18. The method of claim 11, further comprising receiving, by the second mobile communication terminal, in a radio resource of the plurality of uplink radio resources, information identifying the first mobile communication terminal, and wherein the transmission of information for triggering the first mobile communication terminal to operate such that the interference is reduced comprises transmitting, by the second mobile communication terminal, a control message requesting the identified first mobile communication terminal to perform scheduling of transmission for reducing the interference on the at least one uplink radio resource.

19. The method of claim 11, further comprising receiving, by the second mobile communication terminal, in a radio resource of the plurality of uplink radio resources, information identifying the first mobile communication terminal, and wherein the transmission of information for triggering the first mobile communication terminal to operate such that the interference is reduced comprises transmitting, by the second mobile communication terminal, a control message requesting the identified first mobile communication terminal to start a procedure of negotiation with the second mobile communication terminal and the third mobile communication terminal regarding transmission on the plurality of uplink resources for reducing the interference on the at least one uplink radio resource.

20. A mobile communication terminal configured to operate via at least one downlink resource of a plurality of downlink radio resources in relation to a base station in a cell in a cellular mobile communication system, the terminal comprising:
- detection circuitry for detecting a deterioration of radio reception on at least one downlink radio resource,
- determination circuitry for determining that the deterioration of radio reception on the at least one downlink radio resource is due to interference from transmissions by any of a second mobile communication terminal and a third mobile communication terminal involved in a device-to-device communication session between the second mobile communication terminal and the third mobile communication terminal, and
- transmission circuitry for transmitting, in a radio resource of the plurality of downlink radio resources, information for triggering any of the second and third mobile communication terminals to operate such that the interference is reduced.

21. A mobile communication terminal the mobile communication terminal being configured to operate as a second mobile communication terminal in a device-to-device communication session with a third mobile communication terminal, the device-to-device communication taking place via at least one uplink radio resource of a plurality of uplink radio resources, said uplink radio resources being in relation to a base station in a cell in a cellular mobile communication system, the mobile communication terminal comprising:
- detection circuitry for detecting a deterioration of radio reception on the at least one uplink radio resource when the second mobile communication terminal is involved in a device-to-device communication session with the third mobile communication terminal,
- determination circuitry for determining that the deterioration of radio reception on the at least one uplink radio resource is due to interference from transmissions by a first mobile communication terminal, and
- transmission circuitry for transmitting, in a radio resource of the plurality of uplink radio resources, information for triggering the first mobile communication terminal to operate such that the interference is reduced.

* * * * *